United States Patent
Leclerc et al.

(10) Patent No.: US 11,906,775 B2
(45) Date of Patent: Feb. 20, 2024

(54) NARROW BORDER DISPLAY

(71) Applicant: Apple Inc., Cupertino, CA (US)

(72) Inventors: Michael E. Leclerc, Mountain View, CA (US); Chi Xu, Santa Clara, CA (US); Po-Wen Chiu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/653,569

(22) Filed: Mar. 4, 2022

(65) Prior Publication Data

US 2022/0342144 A1     Oct. 27, 2022

Related U.S. Application Data

(60) Provisional application No. 63/178,692, filed on Apr. 23, 2021.

(51) Int. Cl.
*F21V 8/00* (2006.01)
*G02F 1/1333* (2006.01)

(52) U.S. Cl.
CPC ......... *G02B 6/0088* (2013.01); *G02B 6/0015* (2013.01); *G02F 1/133331* (2021.01)

(58) Field of Classification Search
CPC .. G02B 6/0015; G02B 6/008; G02F 1/133331
See application file for complete search history.

(56) References Cited

U.S. PATENT DOCUMENTS

| | | | |
|---|---|---|---|
| 9,316,779 B1 | 4/2016 | Hou et al. | |
| 2016/0161659 A1 | 6/2016 | Minami et al. | |
| 2018/0307102 A1 | 10/2018 | Ko et al. | |
| 2019/0250452 A1* | 8/2019 | Yang | G02F 1/13338 |
| 2022/0091457 A1* | 3/2022 | Farrell | G06F 1/1601 |

FOREIGN PATENT DOCUMENTS

| | | | | |
|---|---|---|---|---|
| CN | 110109215 A | * | 8/2019 | .......... G02B 6/0055 |
| CN | 112213884 A | * | 1/2021 | ............ G02B 6/005 |
| JP | 2013045956 A | | 3/2013 | |
| KR | 20080024569 A | | 3/2008 | |
| KR | 20080036437 A | | 4/2008 | |
| KR | 20160067447 A | | 6/2016 | |
| WO | 2014083990 A1 | | 6/2014 | |
| WO | 2017038549 A1 | | 3/2017 | |

OTHER PUBLICATIONS

Innovation Q+ NPL (Year: 2023).*
European Search Report for EP Application No. 22169400.3, dated Sep. 22, 2022 (8 pp.).

* cited by examiner

*Primary Examiner* — Anabel Ton
(74) *Attorney, Agent, or Firm* — DORSEY & WHITNEY LLP

(57) ABSTRACT

An electronic device includes a housing that at least partially defines an exterior surface and an internal volume. The electronic device also includes a display assembly that is at least partially disposed in the internal volume. The display assembly includes a light guide including a transparent plate and a light source positioned at an end of the transparent plate. A light-blocking component is affixed to the housing and at least partially covers a portion of the transparent plate. A translucent portion extends from the light-blocking component and overlaps the transparent plate.

19 Claims, 7 Drawing Sheets

NARROW BORDER DISPLAY

CROSS-REFERENCE TO RELATED APPLICATIONS

This application claims the benefit of U.S. Provisional Patent Application No. 63/178,692, filed Apr. 23, 2021, entitled "NARROW BORDER DISPLAY", the disclosure of which is incorporated herein by reference in its entirety.

FIELD

The described embodiments relate generally to components for an electronic device. More particularly, the present embodiments relate to components and structures for electronic devices.

BACKGROUND

The components of an electronic device, for example, a display assembly of an electronic device and associated components, can include structures having features tailored to the specific purposes for which they are employed. For example, the components can be configured to provide physical support or protection to other components of the electronic device, or to provide for optical enhancement. Further, the components of the electronic device can be designed to provide a unique and pleasing look and feel for a user. Additionally, the components can be designed to optimize one or more dimensions of the device, such as an amount of an active area of the display.

Recent advances in electronic devices have enabled high levels of performance. Existing components, structures, and methods of assembly for electronic devices, however, can limit the levels of performance of such devices. For example, traditional components can limit the amount or relative percentage of active area of a display. Similarly, traditional methods of device assembly can include features or components that inhibit device performance or user experience. Further, traditional structures and methods used to assemble an electronic device can undesirably limit one or more dimensions of the device relative to the individual dimensions of each component. In this regard, further tailoring of components for electronic devices can provide additional or enhanced functionality, desired dimensions, and pleasing aesthetic features.

SUMMARY

According to some aspects of the present disclosure, an electronic device includes a housing at least partially defining an exterior surface and an internal volume of the electronic device, and a display assembly at least partially disposed in the internal volume. The display assembly can include a light guide, a light source positioned at an end of the light guide, a light-blocking component that is affixed to the housing and at least partially covers the light source and a portion of the light guide, and a translucent portion that extends from the light-blocking component and overlies the light guide.

In some examples, a transparent cover overlies the display assembly and at least partially defines the exterior surface of the electronic device. A film can be positioned between the transparent cover and the translucent portion. The light guide can include a transparent plate that defines a mixing region for light emitted from the light source. The translucent portion can extend over the entire mixing region. The light-blocking component can include an opaque bracket that extends at least partially over the light source and the transparent plate.

In some examples, the translucent portion is adhered to the light-blocking component. The translucent portion can be overmolded onto the light-blocking component. The translucent portion can be an optically treated plastic material. The translucent portion can include polyethylene terephthalate. The translucent portion can define a first exterior surface that is offset from a second exterior surface defined by the light-blocking component. In some examples, the translucent portion includes a diffusive film. In some examples, the mixing region and the light-blocking component is not visible to a user at a viewing angle of less than 50 degrees relative to a place defined by the display assembly. The light source can include at least 100 light emitting diodes.

According to some aspects, a display assembly includes a light guide plate including a major surface, an optical film positioned adjacent the major surface of the light guide plate, an opaque bracket that extends parallel to the major surface of the light guide plate, at least a portion of the opaque bracket disposed adjacent to the light guide plate along the major surface, and a translucent tab that extends from the opaque bracket, the translucent tab positioned between the optical film and the light guide plate.

In some examples, the optical film includes at least one of a polarizer, a prism, or a diffuser. The translucent tab can be secured to the opaque bracket using an adhesive. The translucent tab can be overmolded onto the opaque bracket. A portion of the translucent tab can extend about 1 mm to about 3 from the opaque bracket.

According to some aspects, an electronic device includes a housing at least partially defining an exterior surface and an internal volume, a display assembly at least partially disposed in the internal volume, the display assembly including a transparent cover at least partially defining the exterior surface of the electronic device, an optical film positioned between the transparent cover and the housing, the optical film including a first end, and a second end, the first end fixed to the housing, a translucent component secured to the housing and positioned between the second end of the optical film and the housing.

In some examples, an opaque ledge has a first end fixed to the housing, and a second end coupled to the translucent component. The translucent component can be cantilevered off the opaque ledge.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
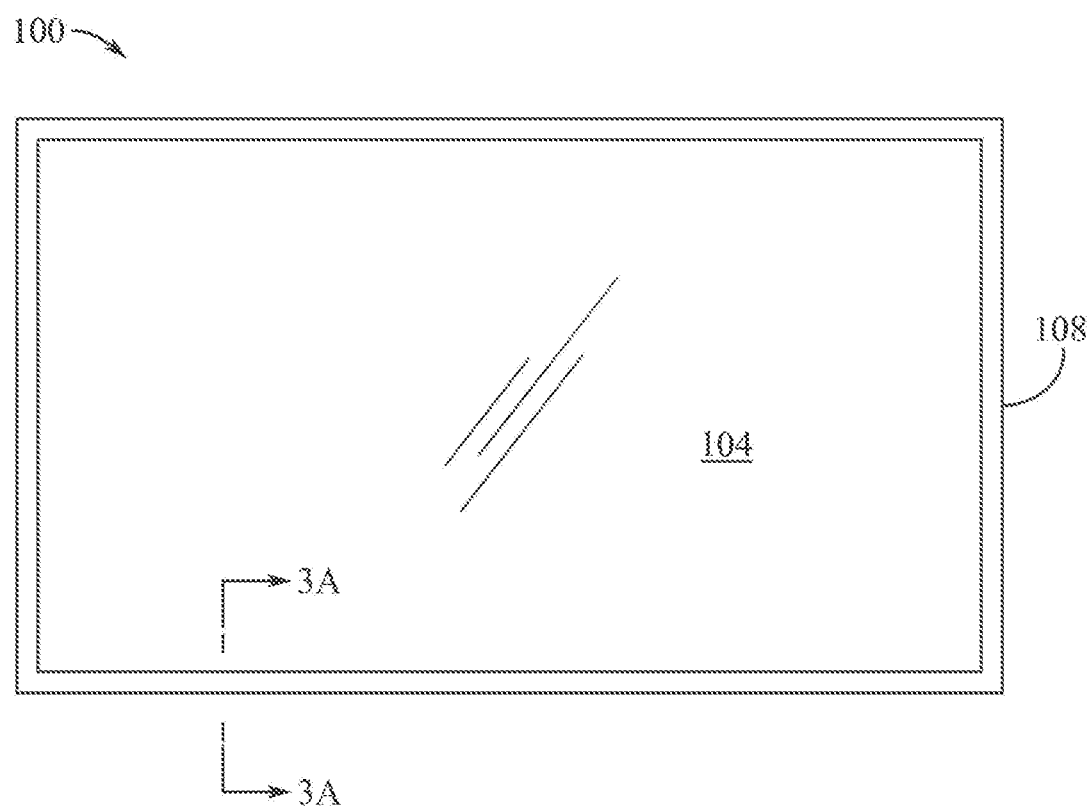
FIG. 1 shows a front view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The architecture and components of electronic devices, including display portions, described herein, can allow for configurations of an electronic device that can maximize the active area of a display or display cell in a display portion, while still achieving desired levels of functionality. In traditional electronic device configurations, such as with traditionally designed desktops, the display device can include relatively large bezels or borders around most or all of the periphery of the active display cell to hide components of the display assembly in the display portion housing.

The components, features, and configurations described herein can allow for display device designs that maximize the user-facing active area of the display, while minimizing or even eliminating the bezels adjacent to the display cell, while maintaining the same or even improved levels of display performance. For example, the display portions described herein can have relatively small or even no bezel area around the bottom edge of a display cell. Such a reduced border configuration can utilize additional unique designs to accommodate for the improved display area. In some examples, supportive ledges and/or tabs are provided to limit movement of the display assembly. In some examples, the ledges and/or tabs additionally enable maintained or improved display performance while reducing border size.

In some examples, an electronic device includes a housing having a back wall and side walls that at least partially define an exterior surface and an internal volume. The electronic device can include a transparent cover, such as a cover glass that defines a front of the electronic device and at least partially defines the exterior surface of the electronic device. The electronic device can include a display assembly or display unit that is at least partially disposed in the internal volume defined by the housing. The display assembly can include a light guide plate, also referred to as simply a light guide, formed from a transparent plate. A light source can be positioned at an end of the light guide. The light source can be one or more light emitting diodes (LEDs). The light guide can also define a mixing region positioned at the end of the transparent plate that is adjacent to the light source. The mixing region can be a zone or region of the light guide wherein light from individual LEDs of the light source can be diffused together so that beyond the mixing region it is not possible to discern that the light source includes multiple sources, such as multiple LEDs. The size of the mixing region can be dependent upon the material of the light guide, the dimensions of the light guide, as well as the wavelength, intensity, or other properties of the light emitted from the light source.

The display assembly can further include an opaque, light-blocking component, such as a ledge or a bracket, that is affixed to the housing and that at least partially covers or overlaps a portion of the light guide. For example, the opaque ledge can be positioned so as to overlap at least a portion of the mixing region of the light guide. The opaque ledge can be used to reflect light into the mixing region of the light guide (e.g., reflect light back into the mixing region to further aid in diffusion or mixing). The opaque ledge can also be used to block the mixing region of the light guide from a user's view. In some examples, the light-blocking component can include metal, ceramic, plastic, or combinations thereof.

In some examples, when the opaque ledge alone is used to cover at least a portion of the mixing region, the opaque ledge can approach too closely to the active area of the display, where it is visible to the user. For example, the opaque ledge may be seen by a user at a viewing angle of 30 degrees or greater. In contrast, if the opaque ledge is too short and does not cover enough of the mixing region, the mixing region itself may be visible to the user. Further, the display assembly can include films that contract or shorten in response to internal or external conditions, such as humidity, temperature, and the coefficient of thermal expansion.

To allow for such variations in the size and position of the films, the films can be secured to the electronic device at their top end (e.g., the end nearest the top of the electronic device when in an upright position, and the bottom ends of the films can be free-hanging (i.e., not attached to any of the components of the electronic device. This allows to film to both contract and expand freely. In some examples, when the films are contracted, they may no longer overlap the opaque ledge and may become snagged on the opaque ledge when returning to a non-contracted length. Thus, a balance must be struck between an opaque ledge that is sufficiently long to cover the mixing region and to remain overlapped with the films, while also being sufficiently short to not be seen by a user at an undesirable small viewing angle.

To address the above concerns, an at least partially translucent or transparent portion or tab can extend from the opaque ledge to overlap the light guide. In other words, the tab can be positioned between the films and the light guide. In some examples, the tab is formed from polyethylene terephthalate. The tab can be formed from any suitable polymer material. The tab can be transparent or semi-transparent. In some examples, the tab is optically treated and/or texturized to manipulate light.

Therefore, to prevent the films from snagging on the opaque ledge during expansion and contraction, the tab can extend from the opaque ledge such that the films are in contact with the tab, even when the films are in a contracted or shortened state. Further, the optical properties of the tab allow for minimized interference with the display being presented to the user while providing additional guidance and support for the films. In some examples, the tab can be adhered to the opaque ledge using any suitable adhesive, including but not limited to, pressure sensitive adhesive. In some examples, the tab is overmolded onto the opaque ledge.

Generally, the devices described herein are used in an upright position. As used herein, an "upright" configuration or position is a configuration in which an elongated height dimension of the device is more parallel than perpendicular relative to the gravitational direction. For example, an electronic device is upright when it is in a vertical orientation similar to a picture frame hanging on a wall or supported by a kickstand. With this understanding, the terms "top," "bottom," "side," "front," "back," "rear," "above," "below," "under" and other such positional terms are to be understood in relation to an upright electronic device, but are used for reference purposed only. For example, a top portion of a device can be located above a bottom portion in some orientations of the device, but can also be located in line with, below, or in other spatial relationships with the bottom portion depending on the orientation of the device. Further, these reference terms may be used in relation to a particular orientation illustrated in one of the figures. For example, the term "above" may be used relative to the particular orientation depicted in the figures instead of referring to the device in an upright position. These reference terms are not intended to limit the device to any one orientation and it should be understood that the devices described herein can be used or operated in orientations other than upright. Additionally, the term "length" or "height" refers to a top-to-bottom measurement, the term "width" refers to a side-to-side measurement, and the term "thickness" refers to a front to back measurement.

These and other embodiments are discussed below with reference to FIGS. 1-5. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a perspective view of an electronic device 100. The electronic device 100 shown in FIG. 1 is a display or a monitor, for example, as can be used with a personal or desktop computer. This is, however, merely one representative example of a device that can be used in conjunction with the ideas disclosed herein. The electronic device 100 can, for example, correspond to a portable media player, a media storage device, a portable digital assistant ("PDA"), a tablet computer, a computer, a mobile communication device, a GPS unit, a remote-control device, or other electronic devices. The electronic device 100 can be referred to as an electronic device, a device, a consumer device, etc. The electronic device 100 can include any number of input devices such as a mouse, a keyboard, a track pad, a stylus, a microphone, or any combination of input devices. The electronic device 100 can include a display 104 and a housing 108. The display 104 can include a computer display such as, for example, a liquid crystal display (LCD), organic light-emitting diode (OLED) display, or any desired display component. The display 104 can be referred to as a monitor, a display screen, a display unit, or a display assembly of the electronic device 100. The housing 108 can be a shell to protect and cover parts of the display 104. In some examples, the housing 108 can include any desired materials, such as rigid and durable materials. For example, the housing 108 can include plastic, metal, ceramic, glass materials, or combinations thereof. In some examples, the housing 108 can include aluminum. In some examples, the housing 108 can define a bezel or border (i.e., a front-facing surface of the housing) extending around a perimeter of the display 104. Using the techniques described herein, the borders, and in particular, the bottom border can have a reduced width of approximately 13.75 mm. In some examples, the housing 108 defines no bezel or chin (i.e., the electronic device 100 includes a full glass front). Further details of the electronic device 100 are provided below with reference to FIG. 2.

Figure 2:
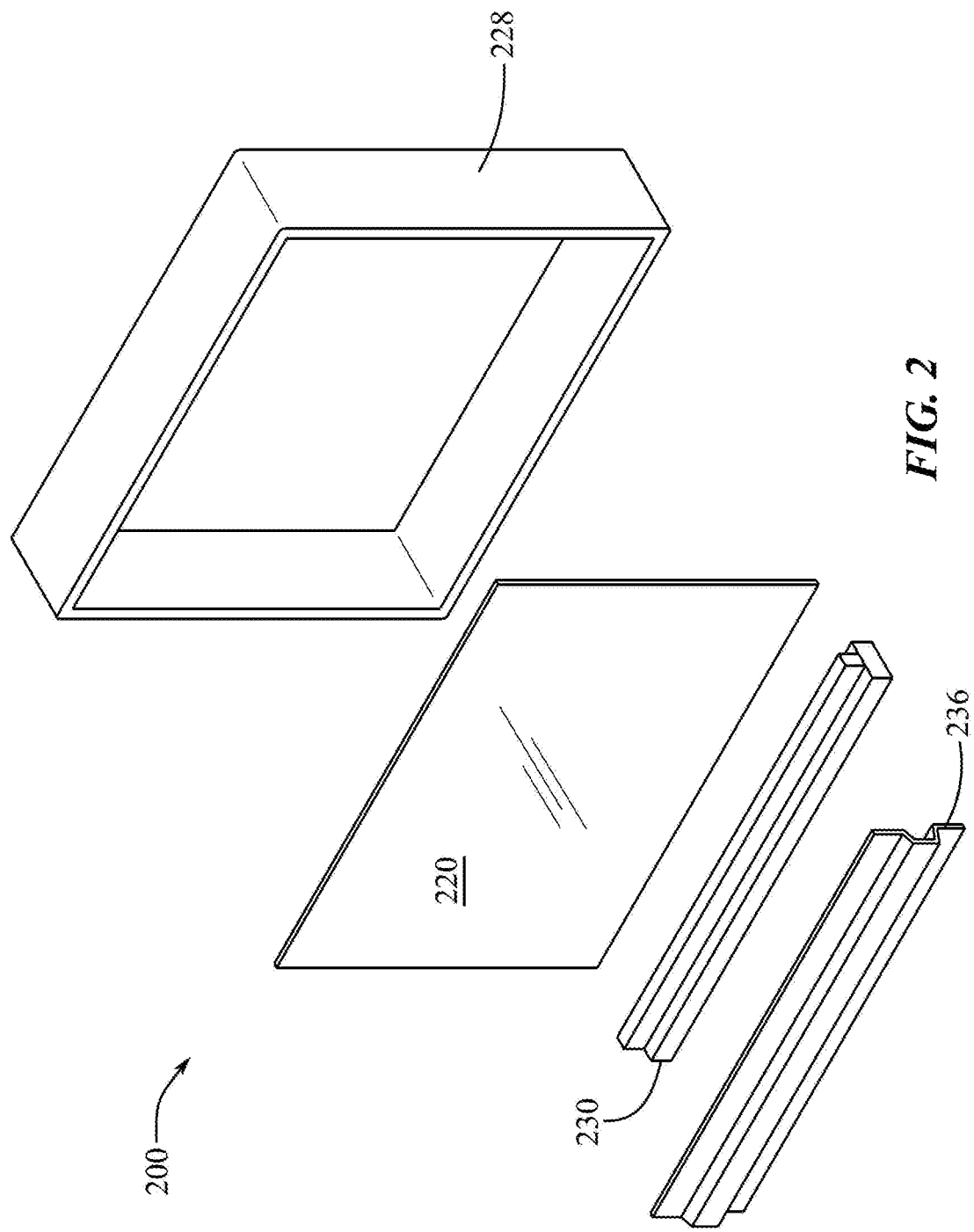
FIG. 2 shows an exploded front perspective view of components of the electronic device of FIG. 1.

FIG. 2 illustrates a perspective exploded view of components an electronic device 200. The electronic device 200 can be substantially similar to the electronic device 100. For instance, the electronic device 200 can include a housing 228 that at least partially defines an exterior surface and an internal volume of the device. In some examples, the housing 228 can include a back wall and multiple sidewalls. The electronic device can include an opaque ledge 236, a light bar 230, and a light guide 220. The opaque ledge 236 can be opaque and can be positioned to shield the light bar 230 and light guide 220 and/or to reflect light from the light guide 220. The opaque ledge can be non-planar and can include a shape to accommodate for various components of the electronic device 200. For example, the opaque ledge 236 can include a bend that receives a portion of the light bar 230. The opaque ledge 236 can be attached to, or can be integrally formed with, the housing 228. For example, the opaque ledge 236 can be affixed to a bottom sidewall of the housing 228, such that the opaque ledge 236 extends into the internal volume, perpendicular to the bottom sidewall of the housing 228.

In some examples, the light bar 230 can include internal components, such as one or more light emitting diodes (LEDs), and printed circuit boards, as described herein. The light bar 230 can include at least 130 LEDs. In some examples, the light guide includes a transparent plate that guides or directs light emitting from the light bar 230. The light guide 220 can be positioned parallel with a major surface of the housing 228. Further details of the display assemblies of electronic devices are provided below.

Figure 3A:
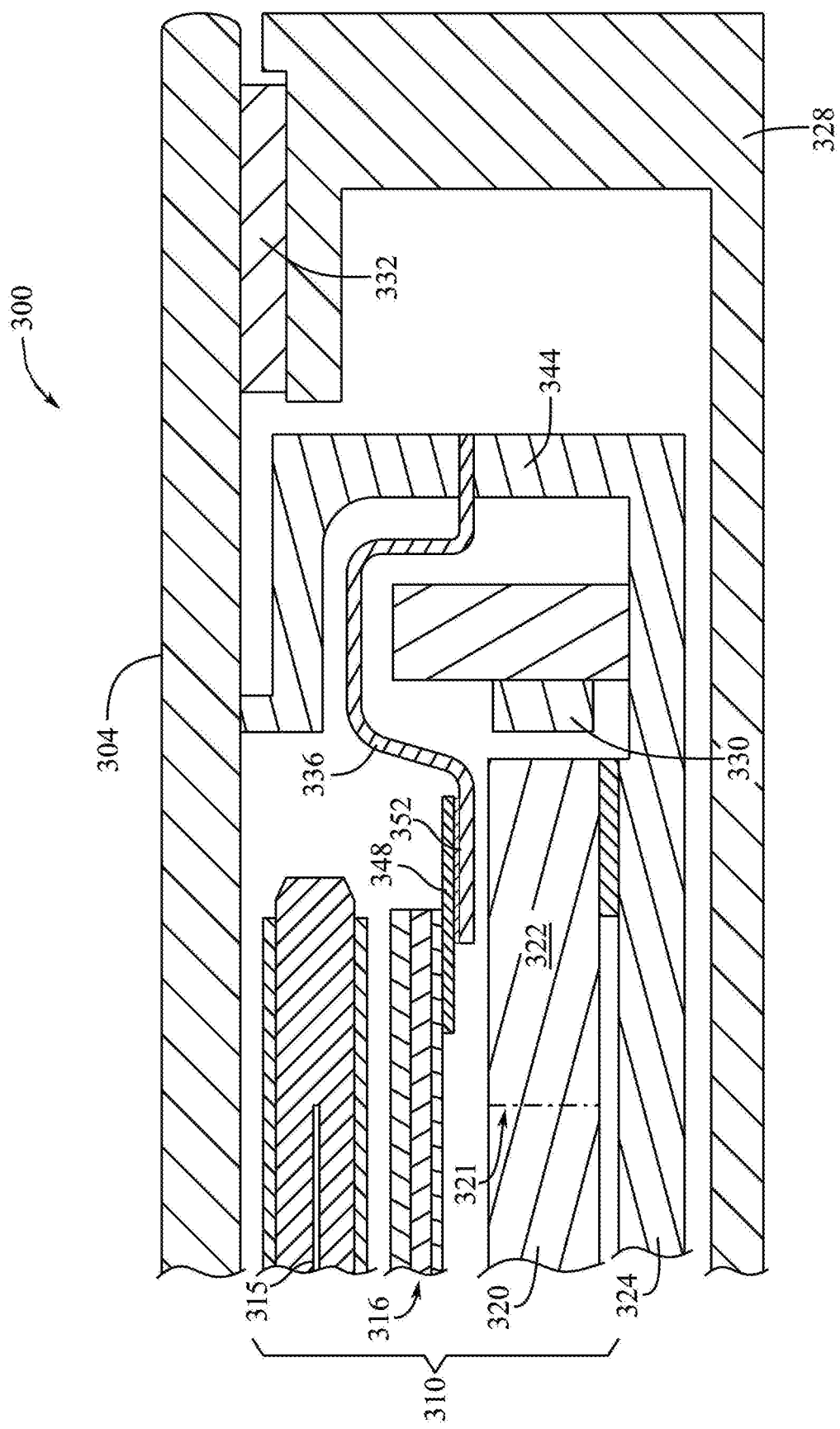
FIG. 3A shows a cross-sectional side view of a bottom portion of an electronic device.

FIG. 3A illustrates a cross-sectional side view of a bottom portion of an electronic device 300. It will be understood that the view depicted in FIG. 3A is of the electronic device 300 in a non-upright position (e.g., laying on its back). The electronic device 300 can be substantially similar to the electronic devices 100 and 200. For instance, the electronic device 300 can include a housing 328, a cover glass 304, a display unit 310, and an opaque ledge 336. The view depicted in FIG. 3A can represent a lower or bottom region of the electronic device 300, although in some examples the components described with respect to FIG. 3A can be located at any position in the device 300.

The electronic device 300 can include a transparent cover 304, such as a cover glass, which can at least partially define an exterior surface of the device 500. Together, the housing 328 and the transparent cover 304 can substantially define the exterior surface and the internal volume of the device 300. The external cover 304 can include any desired transparent material, for example, glass, plastic, sapphire, other transparent materials, or combinations thereof. The display unit 310 can be positioned within the internal volume of the electronic device 300. In some examples, a display unit 310 can be adhered to the transparent cover 304, for example, to a surface of the cover 304 opposite the portion defining the exterior surface of the device 300. In some examples, the display unit 310 can include an LCD unit, although in other examples any form of display unit 310 can be used as desired, such as an LED display unit, OLED display unit, plasma display unit, quantum dot display unit, other display units, or combinations thereof. The display unit 310 can be affixed to the external cover 304 by gluing, adhering, or any other desired securing technique. For example, the display unit 310 can be adhered to the housing 328 by means of a pressure sensitive adhesive (PSA). Further, in some examples, the cover 304 can cover additional components such as a camera, or a touch sensitive surface such as a touchscreen. The display unit 310 can include films 316, a light guide 320, a light bar 330, an opaque bracket 336, and a plastic tab 348. In some examples, the display unit 310 can include one or more electronic components, such as printed circuit boards including processors, memory, and other electrical components.

The films 316 can form a film stack-up that includes one or more optical or compensation films. The films 316 can include one or more of a polarizer, a prism, and a diffuser. In some examples, the films 316 can include one or more of a reflective polarizer, a face-up prism, a face-down prism, a quarter wave film, etc. In some examples, one or more of the films 316 can include an electrochromic color filter (EFC). In other examples, the films 316 do not include an EFC.

Any number of additional internal components can be disposed between a back plate 324 and the cover 304. For instance, the device 300 can also include internal components such as processors, memory, circuit boards, batteries, fans, sensors, and other electronic components. Such components can be disposed within the internal volume defined at least partially by the housing 328 and the cover 304, and can be affixed to the housing 328 via internal surfaces, attachment features, threaded connectors, studs, or posts that are formed into, defined by, or otherwise part of the housing 328 and/or the cover 304.

In some examples, the light bar 330 includes an array of LEDs to emit light into a display unit 310. The light bar 330 can be spaced away from the light guide 320 a predetermined distance to define an air gap between the light bar 330 and an edge of the light guide 320. In some examples, the light bar 330 includes 90-150 LEDs. In some examples, the light bar 330 includes an aluminum printed circuit board. The light bar 330 can be welded to the backplate 324. For example, the aluminum of the light bar 330 can be laser welded to the aluminum of the backplate 324. By welding the light bar 330 to the backplate 324, the light bar 330 is able to better dissipate heat because the weld creates an efficient thermal induction pathway into the backplate 324. Thus, in some examples, there is no need for air flow over the light bar 330. Further, in some examples, there can be a plurality of light bars welded to the backplate 324. By welding the light bars to the backplate 324 instead of using fasteners or other traditional attachment techniques, the number of light bars can be increased without increasing the need for additional cooling.

An end of the light guide 320 nearest the light bar 330 can include a mixing region 322. The mixing region 322 corresponds to a region in which light from the LEDs is mixed together before passing a transition line 321 and reaching an active region of the display (i.e., a region visible to the user). As illustrated, the transition line 321 can correspond to (i.e., be positioned directly beneath) a liquid crystal layer 315 which establishes the active area of the display. The transition line 321 illustrates the transition between the mixing region 322 and the active region of the light guide 320. The size of the mixing region 322 can be based on the number of LEDs in the light bar 330 and the pitch, among other factors. The mixing region 322 can include the air gap that exists between the light bar 330 and the light guide 320. In other words, the length of the mixing region 322 can be established between the light bar 330 and the transition line 321. In some examples, the mixing region 322 can have a length of about 4.7 mm. That is, the distance from the light bar 330 to an active area of the display can be about 4.7 mm. In some examples, the mixing region 322 is between about 1-3 mm. In some examples, the mixing region 322 is about 4-6 mm. The mixing region 322 can organize the light from the light bar 330 in preparation to be viewed by the user. However, it may be undesirable to allow a user to view the mixing region 322 since the light is not yet in order. This may cause the user to see bright or dark patterns on the bottom side of the screen.

The opaque ledge 336 can be affixed to an enclosure 344. The enclosure 344 can be secured to, or can be integrally formed from, a backplate 324. In some examples, the opaque ledge 336 can cover a portion of the mixing region 332. The opaque ledge 336 can be reflective to allow light to recirculate into the mixing region 332 before reaching the active area of the screen. In some examples, the opaque ledge 336 can overlap or even engage the light guide 320 to prevent the light guide 320 from bowing. Thus, the opaque ledge 336 can assist in securing the light guide 320 in place.

The tab 348 can be a translucent or transparent piece of plastic. In some examples, the tab 348 is made from polyethylene terephthalate (PET). The tab 348 can be optically treated to manipulate light passing through the tab 348. In some examples, the tab 348 includes diffusive material, such as a diffusive film. In some examples, the tab 348 includes a coating base, such as coating beads, however, a diffusive film has the advantage of preventing lose particles from being present in the enclosure 344, thereby reducing contamination. The tab 348 can have optical properties that blur the light, while still allowing the light to pass there through. The tab 348 can be secured to the opaque ledge 336. For example, the tab 348 can be adhered to the opaque ledge 336 with adhesive 352. The tab 348 can be positioned between the films 316 and the opaque ledge 336. In some examples, there is no adhesive between the tab 348 and the film 316 to allow for free motion of film 316 when shrinking and expanding. For example, the surface of the tab 348 that contacts the films 316, can be smooth, having a low coefficient of friction with the films 316. The tab 348 can extend over or be cantilevered from the opaque ledge 336 such that the tab 348 extends a distance over the light guide 320. In some examples, the tab 348 extends to a border of the mixing region 322 of the light guide 320 (as represented by dashed lines). Thus, the mixing region 322 can be completely covered by a combination of the opaque ledge 336 and the tab 348.

Figure 3B:
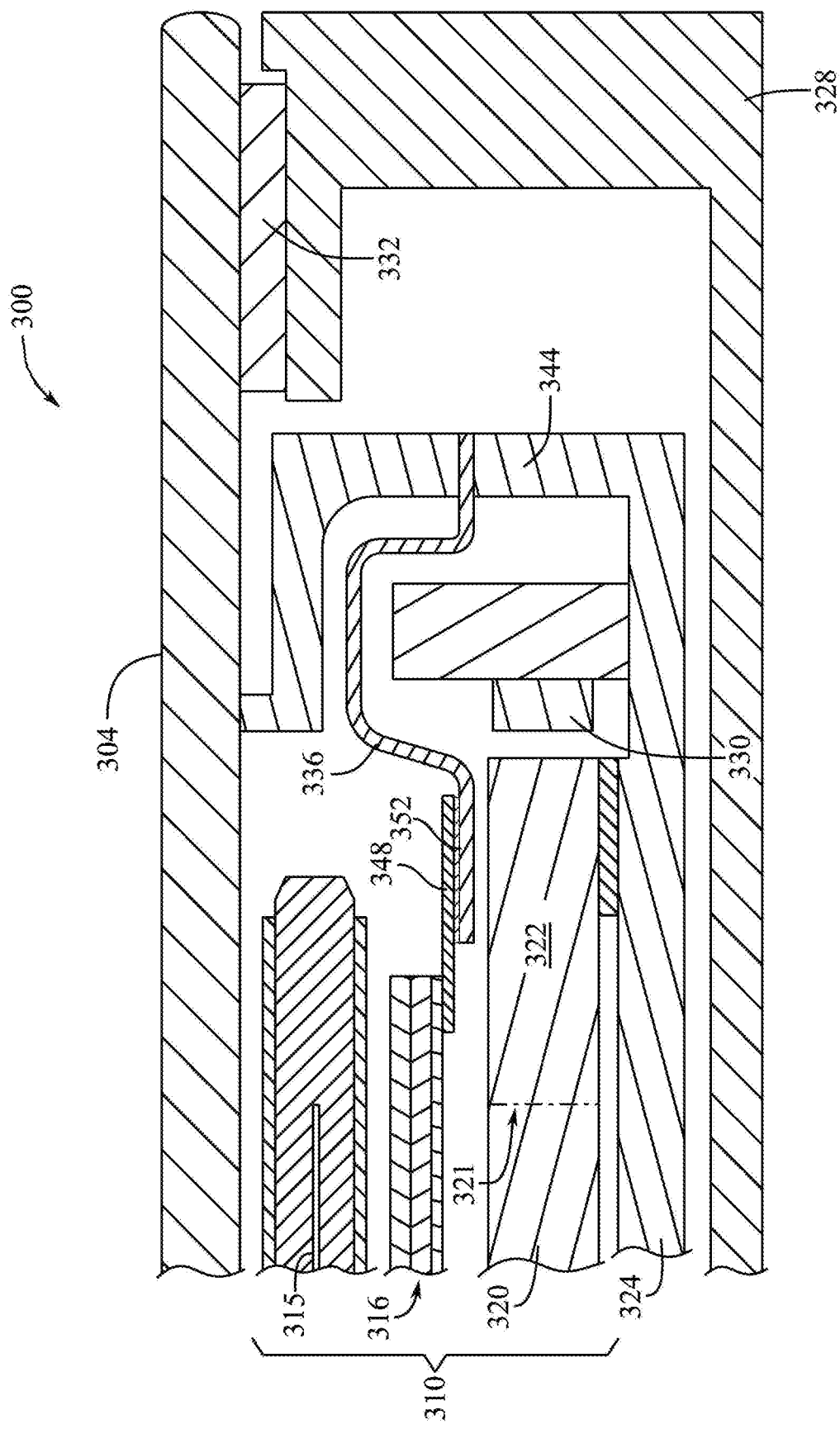
FIG. 3B shows a cross-sectional side view of the electronic device of FIG. 3A.

In some examples, the length of the tab is predetermined to accommodate for contraction in the films 316. For example, the amount the tab 348 overhangs the opaque ledge 336 can be a function of a shortened state of the films 316 (i.e., to prevent the films from slipping off the tab 348). In other words, the tab 348 can be sufficiently long to allow for constant overlap with the films 316. This is illustrated in FIG. 3B which shows the films 316 in a shortened state, having contracted. The films 316 no longer directly overlap the opaque ledge 336, and therefore, if not for the tab 348, the films 316 could potentially become caught or snagged on, under, or behind the opaque ledge 336 when expanding back to the original position. If caught or snagged on, under, or behind the opaque ledge 336, the films 316 risk possibly bending or wrinkling of the film, which could negatively impact the image displayed by the device 300. By remaining constantly and directly overlapped with the films 316, the tab 348 prevents the films 316 from catching on the opaque ledge 336, and therefore, allows the films 316 to smoothly transition from a contracted state to a non-contracted state.

In some examples, the tab 348 is rigid such that it does not significantly bend in response to contact with the films 316. In some examples, the tab 348 is flexible, such that the tab 348 bends in response to contact with the films. The tab 348 can be configured to bend in such a way that it forms a smooth ramp for the films to travel on when extending towards and over the opaque ledge 336.

According to one example, the use of the rigid tab 348 to support the films 316 during expansion and contraction allows for a shorter opaque ledge 336 to be used over the light bar 330, without unnecessarily allowing the mixing region to be seen by a user at a shallow viewing angle. By addressing these potential viewing issues internal to the device 300, the border of the device 300 can advantageously be reduced without compromising the display and risking wrinkling of the film. In some examples, the border can be removed entirely, and the entire front of the device 300 can consist of the cover 304.

Any number or variety of components in any of the configurations described herein can be included in the electronic device. The components can include any combination of the features described herein, and can be arranged in any of the various configurations described herein. The structure and arrangement of components of an electronic device having a housing with structures described herein, and defining an internal volume, as well as the concepts regarding engagement and retention features, can apply not only to the specific examples discussed herein, but to any number of embodiments in any combination. Various embodiments of electronic devices including components having various features in various arrangements are described below, with reference to FIG. 4A.

Figure 4A:
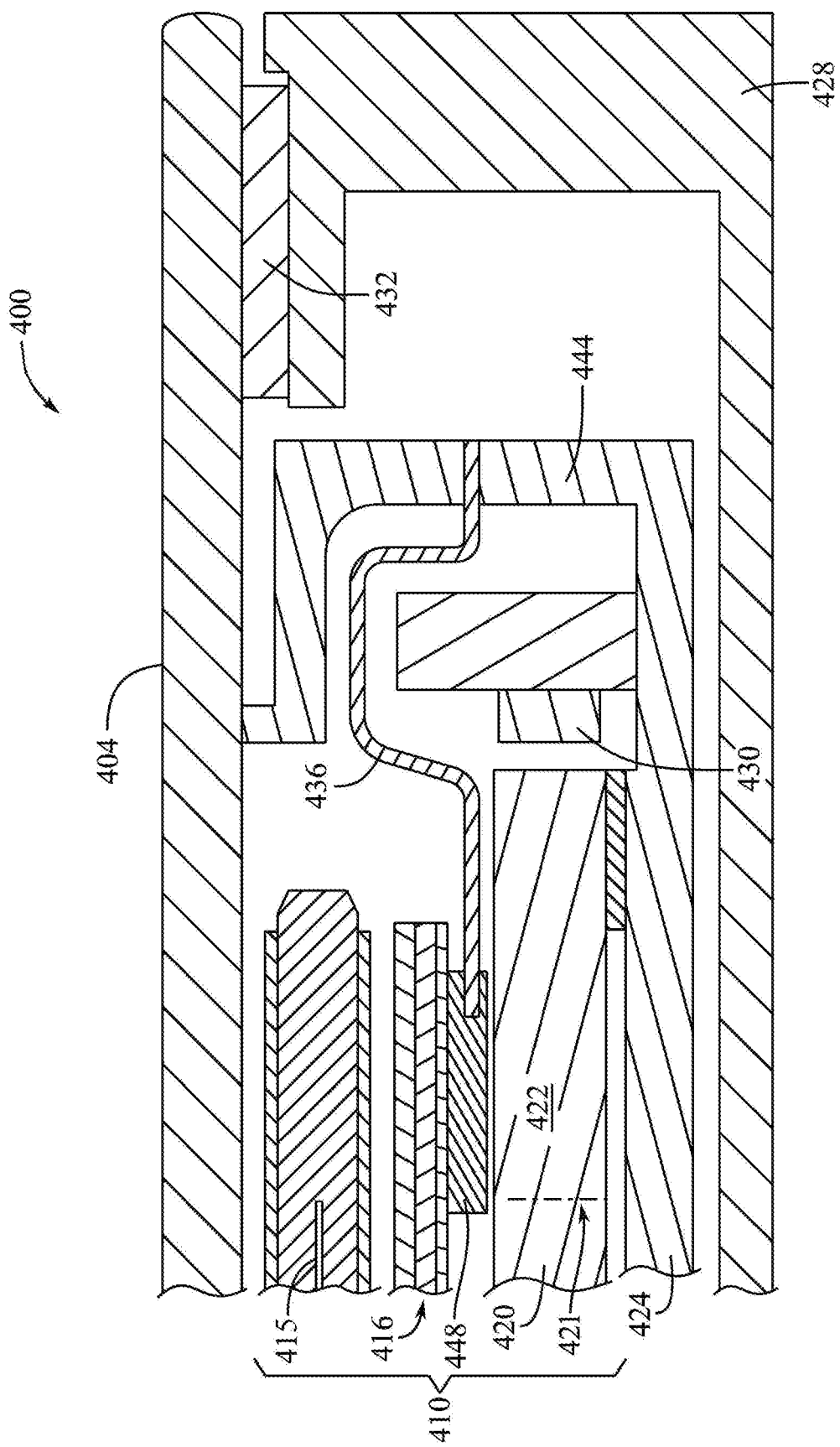
FIG. 4A shows a cross-sectional side view of a bottom portion of an electronic device.
Figure 4B:
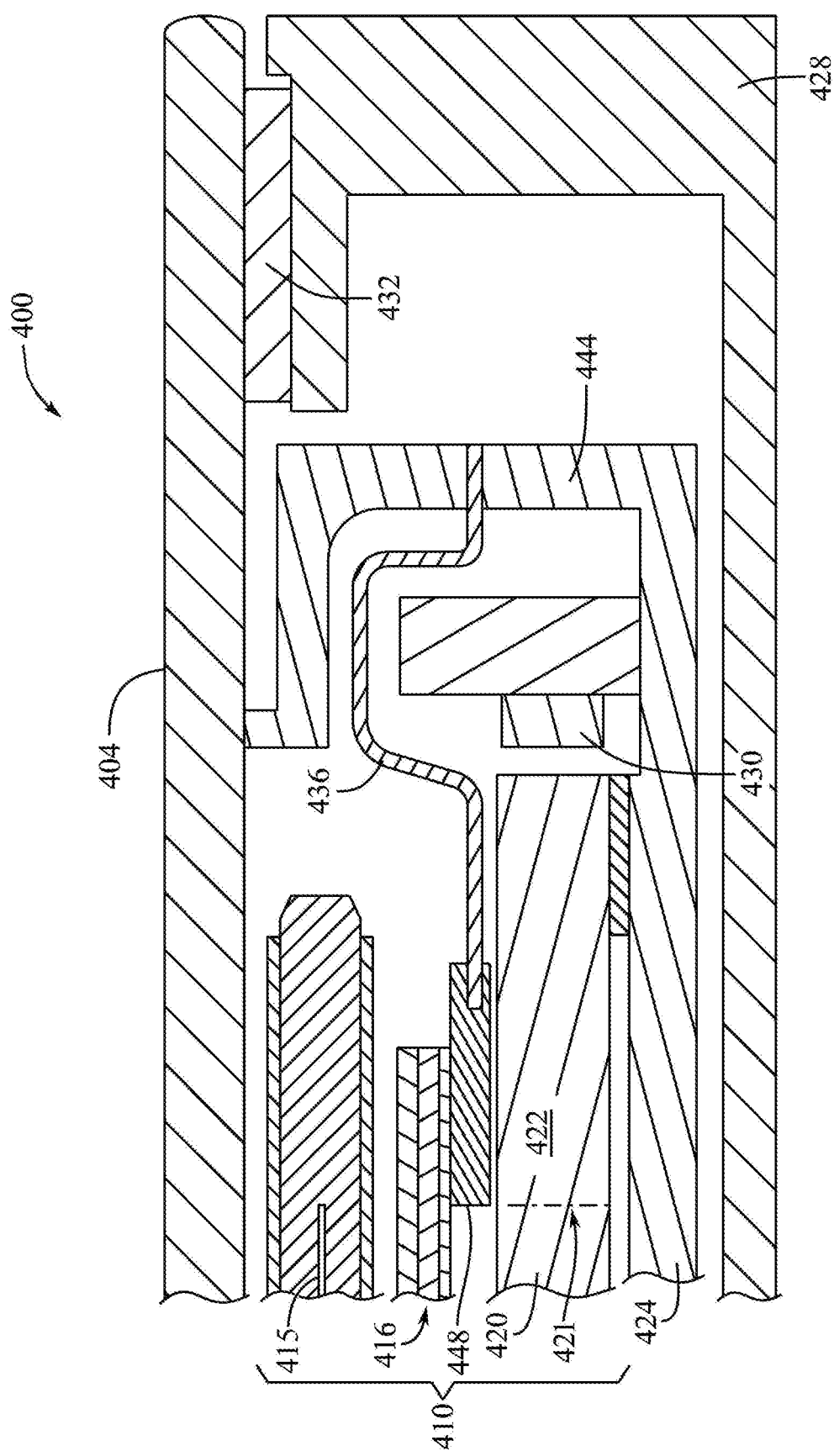
FIG. 4B shows a cross-sectional side view of the electronic device of FIG. 4A.

FIG. 4A illustrates a cross-sectional side view of a bottom portion of an electronic device 400. The electronic device 400 can be substantially similar to the electronic devices 100, 200, and 300. For example, the electronic device 400 can include, among other things, a transparent cover 404 secured to a housing 428 via adhesive 432, a display unit 410, films 416, an opaque ledge 436 affixed to an enclosure 444, a backplate 424, a light bar 430, and a tab 448. The example of FIG. 4A can be considered identical to the example of FIG. 3A, with the exception that the tab 448 is overmolded onto the edge of the opaque ledge 436. Likewise, FIG. 4B is identical to FIG. 4A, with the exception that the films 416 are in a contracted state, to demonstrate how the tab 448 is able to maintain contact or overlap with the films 416.

In some examples, the tab 448 can be intentionally offset from the opaque ledge 436. For example, as shown in FIG. 4A, the tab 448 is proud or stepped up from the opaque ledge 436 to ensure that the films 416 do not catch on the interface between the tab 448 and the opaque ledge 436. In some examples, the tab 448 can be flush with the opaque ledge 436. The tab 448 can be positioned over a portion of the mixing region 422. In some examples, the tab 448 extends to be approximately in axis with the transition line 421, and the liquid crystal layer 415.

Figure 5:
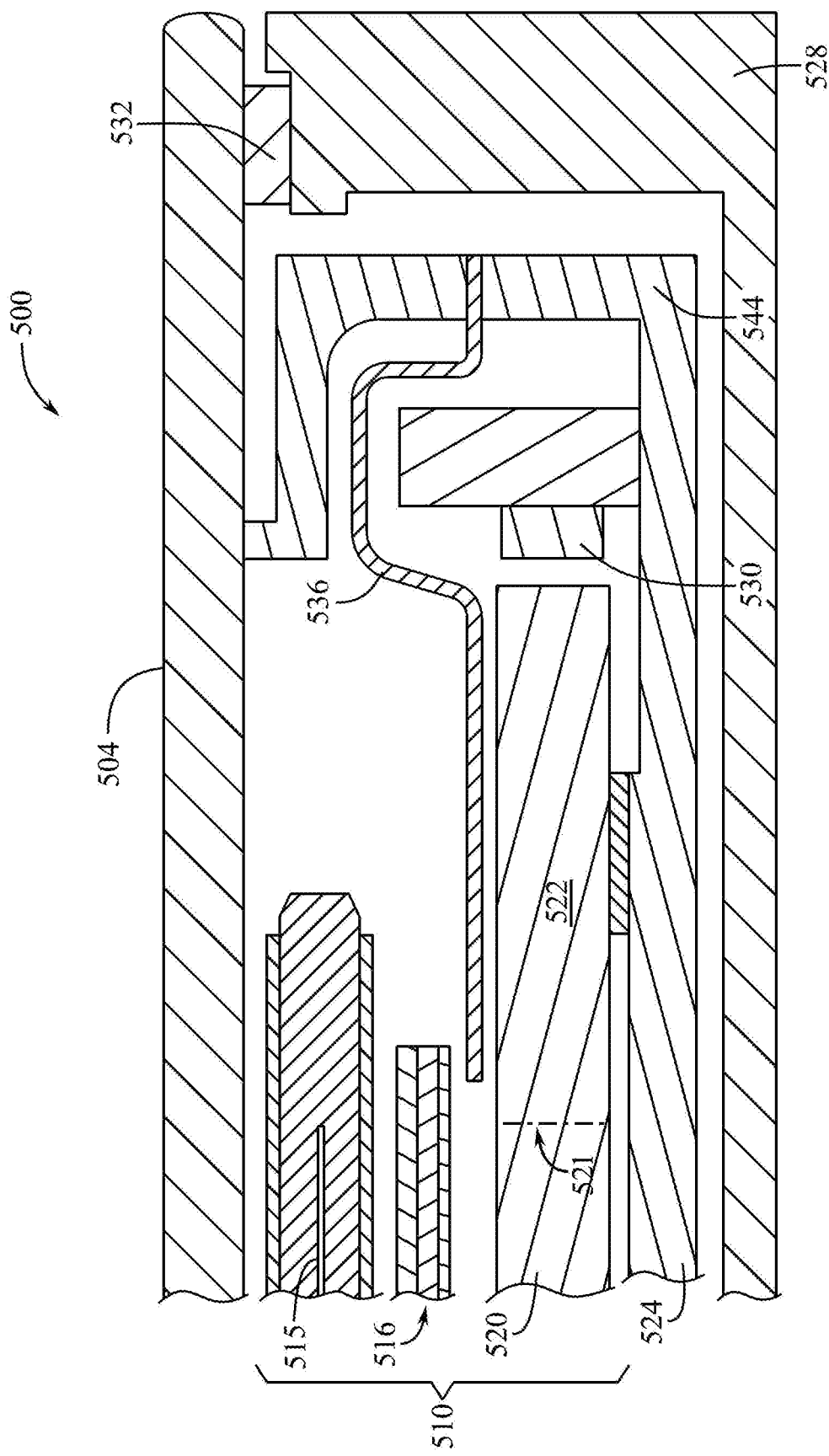
FIG. 5 shows a cross-sectional side view of a bottom portion of an electronic device.

FIG. 5 illustrates a cross-sectional side view of a bottom portion of an electronic device 500. The electronic device 500 can be substantially similar to the electronic devices 100, 200, 300, and 400. For example, the electronic device 500 can include, among other things, a transparent cover 504 secured to a housing 528 via adhesive 532, a display unit 510, films 516, an opaque ledge 536 affixed to an enclosure 544, a backplate 524, and a light bar 530. Unlike the examples of FIGS. 3A-4B, FIG. 5 does not show a tab extending from the opaque ledge 536. The light guide 520, in comparison to the above light guides, is extended to the right, as oriented in FIG. 5, to allow for a mixing region 522 that is increased in size. The mixing region 522 can be considered to begin at the light bar 530 and end beneath the liquid crystal layer 515, as illustrated by the transition line 521. To accommodate for the increased size of the light guide 520, a horizontal extension of the housing 528 can be shortened, which consequently decreases the amount of adhesive 532 securing the cover 504 to the housing 528. Further, in comparison to the opaque ledges 336 and 436, the opaque ledge 536 is lengthened to cover the additional length of the light guide 520.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device comprising:
a housing at least partially defining an exterior surface and an internal volume; and
a display assembly at least partially disposed in the internal volume, the display assembly comprising:
a light guide;
a light source positioned at an end of the light guide;
an opaque component affixed to the housing at least partially covering the light source and a portion of the light guide; and
a translucent portion extending from the opaque component and overlying the light guide.

2. The electronic device of claim 1, further comprising:
a transparent cover overlying the display assembly and at least partially defining the exterior surface; and
a film positioned between the transparent cover and the translucent portion.

3. The electronic device of claim 1, wherein the light guide comprises a transparent plate including a light mixing region, the translucent portion extending over the mixing region.

4. The electronic device of claim 1, wherein the translucent portion is adhered to the opaque component.

5. The electronic device of claim 1, wherein the translucent portion is overmolded onto the opaque component.

6. The electronic device of claim 1, wherein the translucent portion comprises an optically treated plastic material.

7. The electronic device of claim 1, wherein the translucent portion comprises polyethylene terephthalate.

8. The electronic device of claim 1, wherein the translucent portion defines a first exterior surface offset from a second exterior surface defined by the opaque component.

9. The electronic device of claim 1, wherein the translucent portion comprises a diffusive film.

10. The electronic device of claim 3, wherein the mixing region and the opaque component are not visible to a user at a viewing angle of less than 50 degrees relative to the display assembly.

11. The electronic device of claim 1, wherein the light source comprises at least 100 light emitting diodes.

12. A display assembly comprising:
a light guide plate defining a major surface;
an optical film positioned adjacent to the major surface;
an opaque bracket disposed adjacent to the light guide plate along the major surface; and
a translucent tab extending from the opaque bracket, the translucent tab positioned between the optical film and the light guide plate.

13. The display assembly of claim 12, wherein the optical film comprises at least one of a polarizer, a prism, or a diffuser.

14. The display assembly of claim 12, wherein the translucent tab is secured to the opaque bracket by an adhesive.

15. The display assembly of claim 12, wherein the translucent tab is overmolded onto the opaque bracket.

16. The display assembly of claim 12, wherein a portion of the translucent tab extends about 1 mm to about 3 mm from the opaque bracket.

17. An electronic device comprising:
a housing at least partially defining an exterior surface and an internal volume;
a display assembly at least partially disposed in the internal volume, the display assembly comprising:
a transparent cover at least partially defining the exterior surface;

an optical film positioned between the transparent cover and the housing, the optical film being connected to the housing;
a translucent component overlaying the optical film and being secured to the housing.

18. The electronic device of claim 17, further comprising an opaque ledge having a first end fixed to the housing, and a second end coupled to the translucent component.

19. The electronic device of claim 18, wherein the translucent component is cantilevered from the opaque ledge.

* * * * *